United States Patent [19]

Herman

[11] Patent Number: 4,576,560
[45] Date of Patent: Mar. 18, 1986

[54] SMC LOADER FOR COMPRESSION MOLDING PRESS

[75] Inventor: Edmund A. Herman, Mt. Clemens, Mich.

[73] Assignee: General Motors Corporation, Detroit, Mich.

[21] Appl. No.: 671,767

[22] Filed: Nov. 15, 1984

[51] Int. Cl.⁴ ............................................. B29C 43/34
[52] U.S. Cl. .................................... 425/103; 198/692;
  414/222; 414/225; 414/751; 425/107; 425/126
  R; 425/324.1; 425/394; 425/412
[58] Field of Search ................ 425/90, 103, 258, 383,
  425/406, 394, 412, 324.1; 198/692, 693;
  414/222, 225, 751

[56] References Cited

U.S. PATENT DOCUMENTS 3,393,594 7/1968 Wallis .................................. 414/751
3,456,814 7/1969 Bautz .................................. 414/751
4,361,413 11/1982 Toda .................................. 414/225

Primary Examiner—Willard E. Hoag
Attorney, Agent, or Firm—Elizabeth F. Harasek

[57] ABSTRACT

An apparatus is provided for automatically delivering sheet molding compound (SMC) to a compression press preparatory to molding. The SMC is laid on a buck to the mold-charging pattern. It is speared with a plurality of pins which are angled to support the SMC as it is transferred into the press. The pins are withdrawn from the SMC to drop it onto the bottom mold.

6 Claims, 8 Drawing Figures

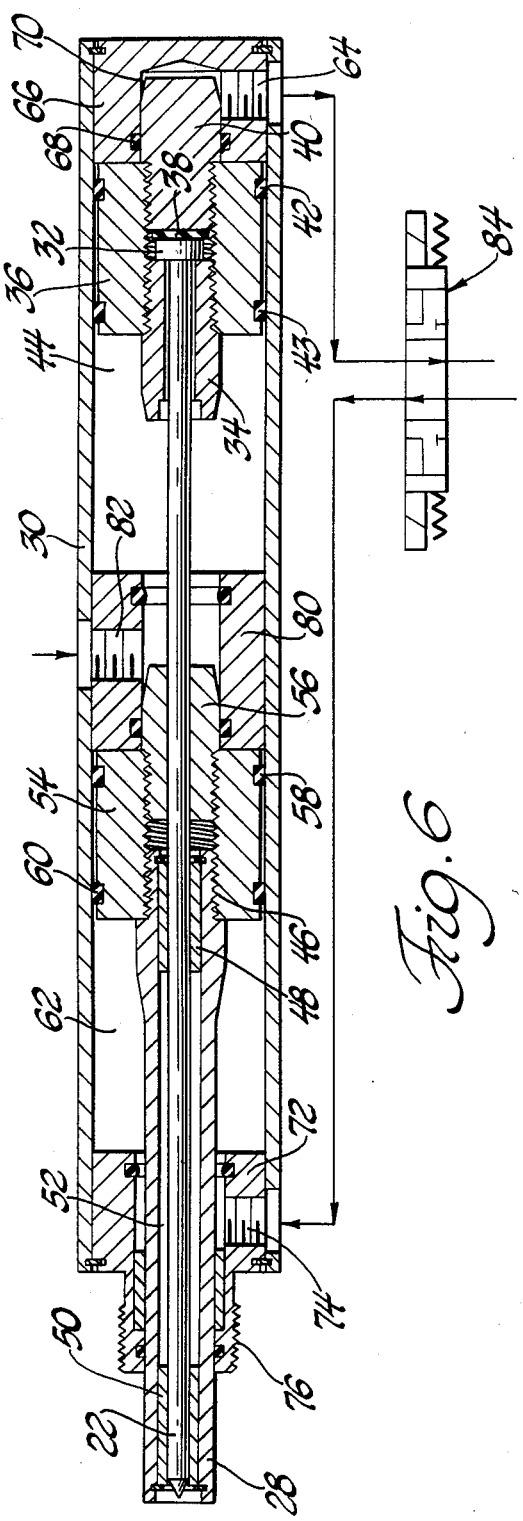
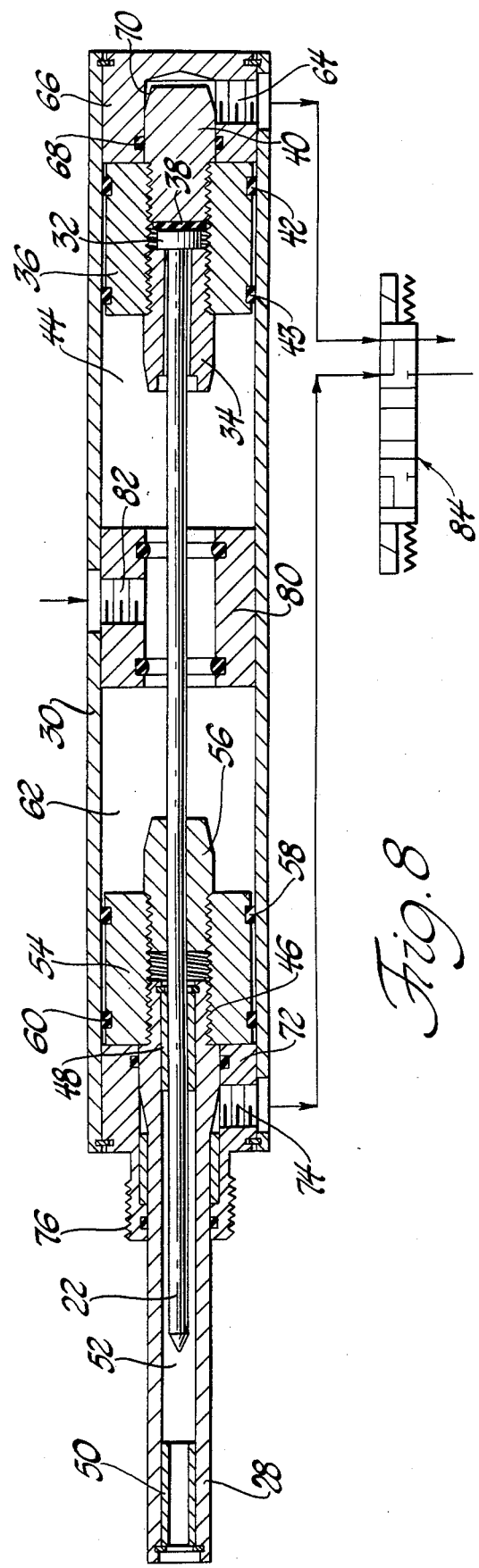

SMC LOADER FOR COMPRESSION MOLDING PRESS

BACKGROUND

This invention relates to a device for automatically loading charges of sheet molding compound onto the lower die of a die set in a compression molding press.

Sheet molding compound (SMC) is a moldable composite material generally made up of an unsaturated liquid polyester resin, a low profile thermoplastic resin, an inert filler, magnesium oxide or other maturation aids, and short lengths (5 cm or shorter) of glass fiber reinforcement. The constitutents are mixed on a film of polyethylene or other such material. The mixture is covered with a second film. The SMC sandwich (film-SMC-film) is rolled-up and allowed to age until the polyester resin matures to a putty-like consistency. Preliminary to molding, the protective sheets are removed and the matured SMC is cut into pieces, generally strips, of appropriate size for a particular mold. These pieces are laid on the bottom mold of a matched set of top and bottom compression molds in a compression press. The molds are heated to cause flow and cure of the SMC. The molds are closed to make a part.

In the past, there has been no satisfactory way for automating the loading of SMC charges into a compression press. An operator had to lay cut pieces of SMC onto the hot lower mold. Manual charge loading is not only labor-intensive, but it can also cause poor and/or inconsistent properties in molded parts. For large parts, several strips or pieces must be loaded onto the lower mold. This can take several seconds. The pieces first laid on the hot mold begin to flow and cure before the press is closed. This may cause uneven cure across the part which can create deviations in mechanical properties and surface defects.

Therefore, there has been a long-felt need for developing a machine for automatically loading SMC in compression presses. However, several significant problems must be overcome.

SMC, by nature, is difficult to handle. Because of its putty-like consistency long strips need to be supported in at least two locations along their length to prevent excess sag as they are positioned in the mold. Attempts have been made to use barbed spears to pierce and then support SMC charges on the barbs. However, when these barbs are pulled back through the SMC, it leaves holes in the charges. Resin flows back into these holes as a part is molded in the compression press but the glass fiber does not. The resin-rich and fiberglass-poor locations are undesirable both mechanically and cosmetically.

Attempts have also been made to use a machine to grip the ends of long strips of SMC, pick them up and place them in the mold. However, the putty-like nature of the SMC makes it difficult to grab the edges without excessive sagging in the middle. Because the SMC is sticky, it is difficult to get it off the grippers.

Accordingly, it is an object of this invention to provide a novel device for automatically loading sheet molding compound charges into compression presses.

BRIEF SUMMARY

In accordance with the preferred practice of my invention, SMC may be automatically charged into a compression mold as follows.

Strips of SMC are positioned on a cold buck, the top surface of which emulates the surface of the bottom mold of the matched mold set in the compression press.

The key to the subject invention is the use of automatically actuated spearing pins sheathed in annular strippers which are strategically located in a loader plate or an equivalent support structure. The lower face of the loader plate preferrably emulates the contours of the bottom mold.

The pins and annular strippers are reciprocatable between retracted and extended positions. They are mounted so that the pins, in the extended position, form an angle not equal to 90° with respect to the surface of the lower buck and the SMC charges laid on it. Impressions are provided in the lower buck to accommodate the extended pins.

To load a charge of SMC strips, they are first laid on the lower buck in the desired pattern. The loader plate is then lowered over the buck and the spearing pins are extended through the SMC charges. Because these pins are acutely angled with respect to the surface of the buck and the SMC strips on it, when the loader plate with extended pins is lifted off of the buck, the SMC strips resting on the pins are carried with the plate. The loader plate is then automatically shuttled between the molds in the compression press, close to the bottom mold. The spearing pins are then retracted and the annular strippers surrounding them are extended. Retraction of the pins and extension of the strippers causes the putty-like SMC pieces to drop onto the lower mold all at once in the desired pattern. The loader plate is then shuttled out of the mold and the press is actuated to close the molds.

Loading a compression press with sheet molding compound using this device and method causes the SMC charges to all be delivered onto the hot bottom mold at the same time. Therefore, cure of the resin is the same across the entire area of even very large parts such as automotive body panels. The pins do not displace the glass fiber or cause resin-rich regions in such parts. Furthermore, it is possible to fully automate the process by having a robot or automated loader initially position the cut SMC pieces on the buck followed by automatic loading into the press.

DETAILED DESCRIPTION

My invention will be better understood in view of the detailed description of preferred embodiments which follows and the several figures in which:

FIG. 6 is a detailed view of a suitable pneumatically actuated spearing pin and stripper cylinder with both pin and stripper in the retracted position.

FIG. 8 shows the pin in the retracted position and the stripper in the extended position.

Figure 1:
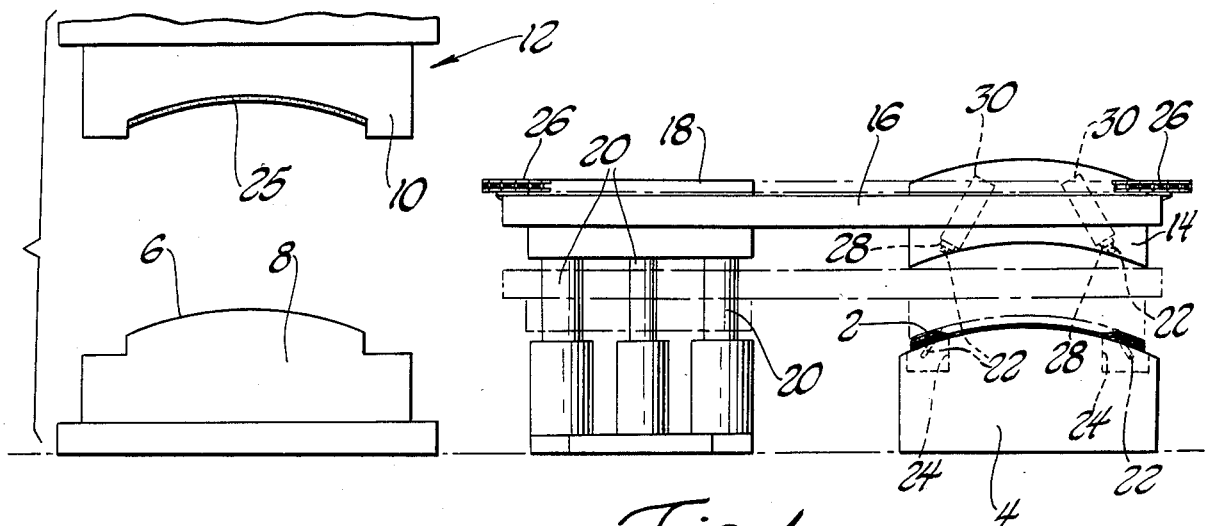
FIG. 1 is a schematic view of an automatic SMC loader in accordance with the invention showing the loader plate over the loading buck.
Figure 2:
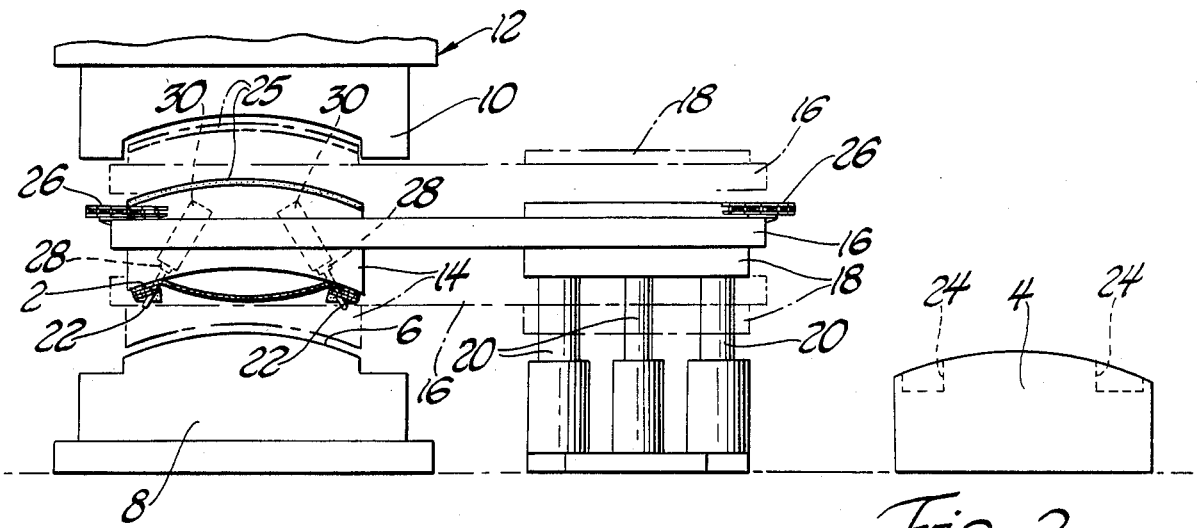
FIG. 2 is a side schematic view of the loader plate between the top and bottom molds of a compression press preliminary to dropping a charge of SMC onto the bottom mold.
Figure 3:
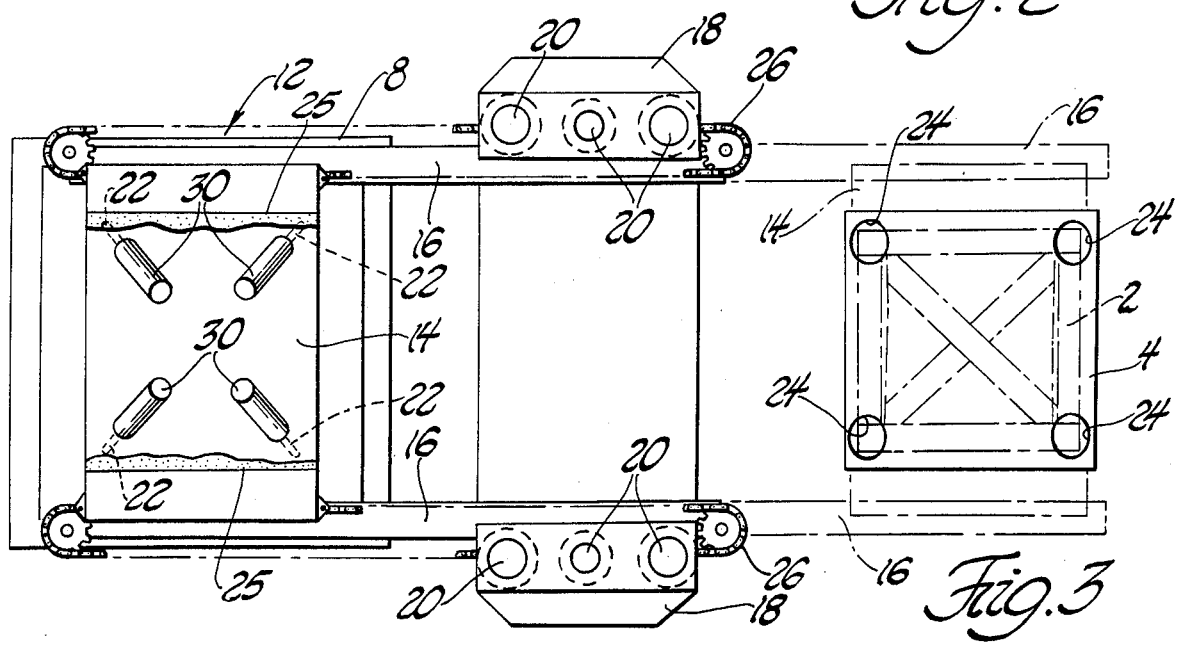
FIG. 3 is a plan schematic sectional view showing the SMC charge in phantom lines on the loading buck and the loader plate between the molds of the compression press.
Figure 4:
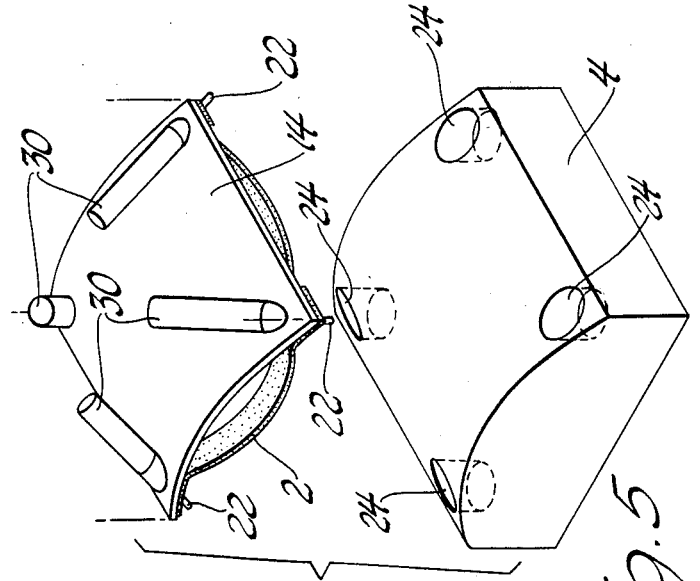
FIG. 4 shows the SMC charges on a loading buck in a pattern for making a large contoured SMC panel.

In accordance with a preferred practice of my invention, SMC may be loaded into a compression press as Referring to FIGS. 1 to 3, strips of SMC 2 are laid on buck 4, the surface of which emulates top surface 6 of bottom mold 8 of a matched set of top mold 10 and bottom mold 8 in a compression press 12. SMC charge 2 may be positioned on the cold buck by a robot or other automated equipment. The mold shown is of the type used to make SMC automotive deck lids. The SMC charge 2 consists of a pattern of two strips about 163 cm long to form an "X" and four more strips about 115 cm long joining the corners of the "X" in a rectangular pattern as best shown in FIG. 4.

Referring again to FIG. 1, after SMC strips 2 are laid on buck 4, a loader plate 14 is brought into position directly over it. Loader plate 14 is supported on rails 16. Vertical motion is provided to rails 16 by platform 18 which can be moved up and down by means of reciprocatable pistons 20.

Figure 5:
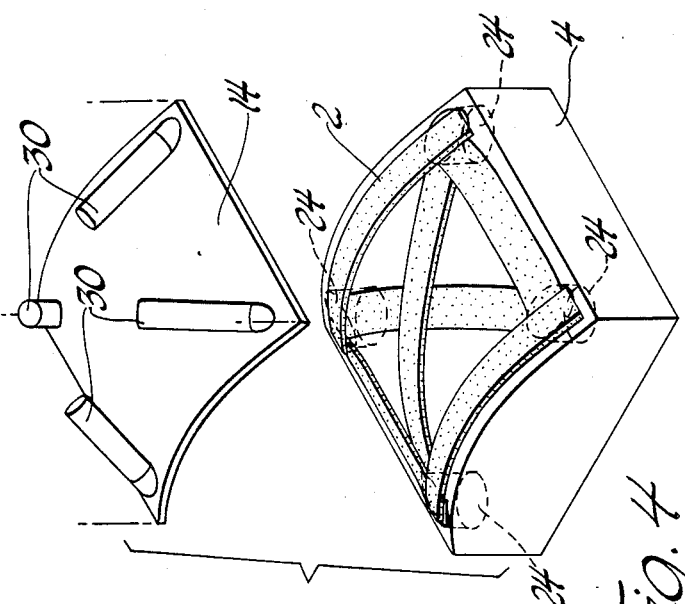
FIG. 5 is like FIG. 4 after the SMC charge has been picked up from the buck by the loader plate.

In order to pick up SMC charge 2 on buck 4, pistons 20 are retracted, causing loader plate 14 to drop as shown in phantom lines in FIG. 1. At this point, spearing pins 22 are extended. The SMC charge 2 is pierced by pins 22 which extend into impressions 24 in buck 4. Pins 22 in the extended position form an acute angle with the surface of the loader plate and the charge. Therefore, when the loader plate is lifted, SMC charge 2 is carried with it and the charge is prevented from falling off by the extended pins. FIG. 4 shows a charge 2 on buck 4 before it is picked up by loader plate 14. FIG. 5 shows the empty buck 4 after SMC charge 2 has been speared by pins 22 mounted in loader plate 14. While the SMC strips sag slightly between pins 22, the pins are spaced close enough to prevent excessive sag that could interfere with delivery. The number of pins required and the spacing between them could be readily determined by one skilled in the art.

Referring particularly to FIGS. 2 and 3, after charge 2 and loader plate 14 have been lifted, rails 16 are moved to the left as depicted by a motor or some other device which is not shown. Loader plate 14 is itself shuttled on rails 16 by drive chains 26 which can also be driven by a motor (not shown). In press loading position, loader plate 14 is positioned directly over bottom mold 8 so that the SMC charge 2 will be properly located for molding when stripped from pins 22. The SMC part 25 molded on the previous cycle and carried with top mold 10 as the press opens is ejected onto the top of carrier plate 14 by ejector pins (not shown), pressurized air, or other conventional means.

Once the loader plate 14 is positioned over bottom mold 8, it is lowered by pistons 20 so that pins 22 are very close to the top surface 6 of bottom mold 8. At this time, pins 22 are retracted and annular strippers 28 are extended. This causes SMC charge 2 to drop onto heated lower mold 8. Rails 16 and loader plate 14 are quickly shuttled out of the press 12 and the molds are closed. Molded part 25 may be unloaded by a robot or other automatic device. The rails and loader plate are then returned to the position shown in FIG. 1 where another charge of SMC is waiting on the buck for the next molding cycle.

Figure 7:
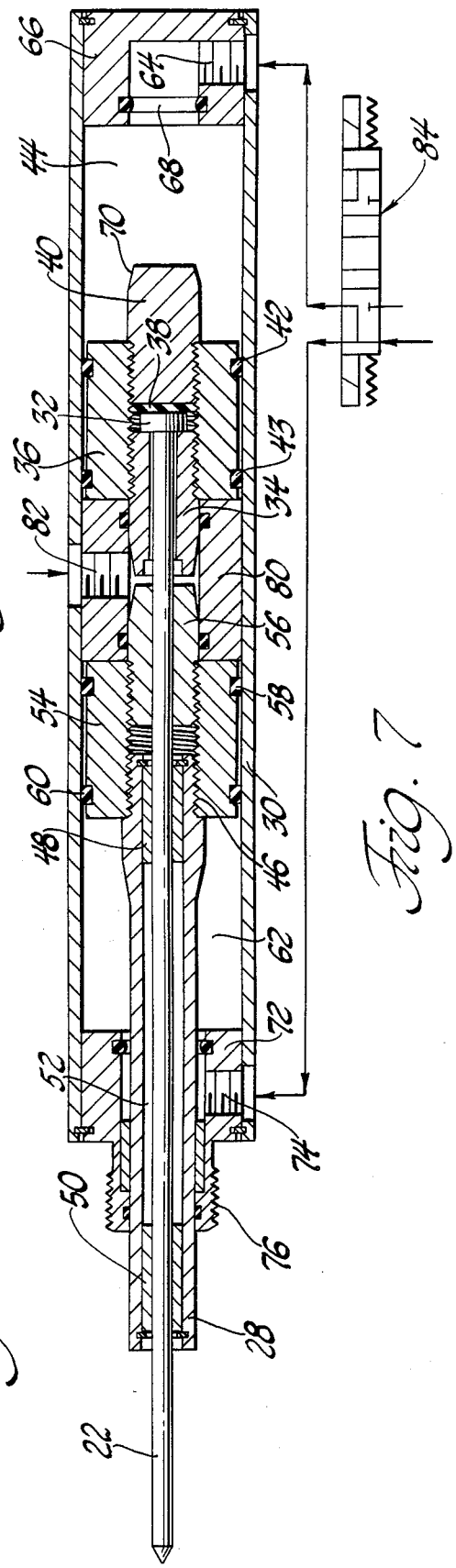
FIG. 7 shows the pin in the extended position.

FIGS. 6–8 show a preferred design for an automatically actuated spearing pin 22 and annular stripper 28 retained in a cylindrical housing 30. FIG. 6 shows the device in the pin-up and stripper-up position. The pin portion of the mechanism consists of a long, pointed pin 22 with an enlarged head portion 32. Pin 22 extends through a retainer bushing 34 which is threaded into an internally threaded annular pin slide 36. Rubber gasket 38 is located above head 32 of pin 22 and is held in place by bolt 40 threaded in slide 36. Seals 42 and 43 allow pin slide 36 to reciprocate in housing 30 and serve to pneumatically isolate the portions of pin actuator barrel 44 above and below the pin slide 36.

The stripper portion of the mechanism consists of annular stripper 28 which has threads 46 on its outside diameter near the top. Upper bushing 48 and lower bushing 50 are retained in stripper barrel 52 (FIG. 8) as a guide for pin 22. Stripper 28 is threaded into an internally threaded stripper slide 54. Annular bolt 56 is threaded into the top portion of stripper slide 54. Pin 22 can reciprocate within barrel 52. Seals 58 and 60 allow stripper slide 54 to reciprocate in housing 30 and serve to pneumatically isolate the portions of stripper actuator barrel 62 above and below stripper slide 54.

Port 64 for high pressure air or other suitable gas or liquid (approximately 80 psi) is located near the top of housing 30 in cylinder cap 66. A seal 68, such as an O-ring, is located just beneath pressure port 64. This ring seals with the chamfered top portion 70 of bolt 40. The stripper mechanism is located within the lower pneumatic stripper actuator barrel 62. A port 74 for high pressure air is located in the side of bottom stop 72. Bottom stop 72 has threads 76 on its outside diameter so that it can be screwed into the loader plate or other retaining means.

A stationary, low-pressure manifold 80 is located in housing 30 between the slides of the pin and the annular stripper. A port 82 for low pressure air or other suitable gas or liquid (about 40 psi) is located in manifold 80 and is in fluid flow communication with pin barrel 44 and actuator barrel 62. A small amount of oil can be mixed with the low pressure gas in manifold 80 to lubricate pin 22 as it is extended and retracted. The air flows in and out of high pressure ports 64 and 74 which is controlled by valves 84. Valves 84 may be automatically controlled by conventional means.

FIG. 7 shows pin 22 and stripper 28 in position after high pressure air is allowed to flow into ports 64 and 74. Since this pressure is higher than the pressure of air in low pressure port 82, pin 22 is fully extended and stripper 28 fully retracted. The position of pin 22 in FIG. 7 corresponds to its SMC lifting position in FIG. 5, for example.

SMC would be picked up and carried to the mold in the pin-extended and stripper retracted positions. However, once the SMC is located over the bottom mold in the compression press, the source of high pressure air to ports 64 and 74 would be shut off and the high pressure air vented. At such time, the mixture of air and oil at low pressure port 82 would cause the stripper pin 22 to be retracted into the fully up position while stripper 28 would be moved to its fully extended position as shown in FIG. 8. This motion causes the SMC to be pushed off the pin and into the mold and without any substantial disturbance to the glass fiber filler in the SMC. Both pin 22 and stripper 28 are retracted preparatory to the next delivery cycle. Table I sets out the relative pin and stripper positions as a function of the high pressure air control.

TABLE I

| | HIGH PRESSURE AIR TO PORTS | |
|---|---|---|
| | PORT OVER PIN SLIDE | PORT UNDER STRIPPER SLIDE |
| FIG. 6 | | |
| PIN UP STRIPPER UP | VENTED | OPEN |
| FIG. 7 | | |
| PIN DOWN STRIPPER UP | OPEN | OPEN |
| FIG. 8 | | |
| PIN UP STRIPPER DOWN | VENTED | VENTED |

The invention has been described in terms of a pneumatically controlled system. Clearly, like ends could be accomplished using an electrically controlled system of motors and gears to control the pins and strippers. Other charges could also be made in keeping with the invention which is a novel method of automatically delivering SMC charges to a compression mold and the apparatus used therefor. The method depends on spearing pieces of SMC with angled pins, carrying the SMC into the mold on the pins and dropping the SMC onto the mold by retracting the pins and/or pushing the SMC off the pins with strippers as described herein.

While my invention has been described in terms of specific embodiments thereof, clearly other forms of the invention would be readily evident to one skilled in the art. Accordingly, the subject invention is to be limited only by the scope of the following claims.

The embodiments of the invention in which an exclusive property or privilege is claimed are defined as follows:

1. An apparatus for automatically delivering sheet molding compound (SMC) into a compression press having top and bottom molds between which the SMC is molded comprising a buck for forming the SMC in the molding configuration before it is delivered into the mold; a plurality of pins which are mounted in a plate of a shape conforming substantially to said buck; means to reciprocate said pins between extended and retracted positions such that in the extended position they can pierce the SMC and pick it up from the buck and retain it as it is moved into the mold and such that in the pin retracted position the SMC can be dropped onto the bottom mold in the compression press and means to lift and transfer said compound from above said buck to above said mold.

2. The apparatus of claim 1 where means are provided to lubricate the pins with a mixture of air and oil.

3. The apparatus of claim 1 where the extension and retraction of the pins is pneumatically actuated.

4. An apparatus for automatically delivering sheet molding compound (SMC) into a compression press having top and bottom molds between which the SMC is molded comprising a buck for forming the SMC in the molding configuration before it is delivered into the mold; a plurality of pins and strippers for said pins which are mounted in a retainer having a shape conforming substantially to said buck to position them over the SMC on the buck; means to reciprocate said pins and said strippers between extended and retracted positions such that in the pins retracted and strippers extended positions the SMC can be dropped onto the bottom mold in the compression press and means to lift and transfer said compound from above said buck to above said mold.

5. The apparatus of claim 4 where means are provided to lubricate the pins with a mixture of air and oil.

6. The apparatus of claim 4 where the extension and retraction of the pins is pneumatically actuated.

* * * * *